United States Patent

Götz et al.

(10) Patent No.: US 7,848,360 B2
(45) Date of Patent: Dec. 7, 2010

(54) METHOD FOR TRANSMITTING SYNCHRONIZATION MESSAGES IN A COMMUNICATION NETWORK

(75) Inventors: Franz-Josef Götz, Heideck (DE); Chongning Na, München (DE); Dragan Obradovic, Ottobrunn (DE); Ruxandra Scheiterer, Geretsried (DE); Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 12/231,660

(22) Filed: Sep. 4, 2008

(65) Prior Publication Data

US 2009/0086766 A1 Apr. 2, 2009

(30) Foreign Application Priority Data

Sep. 7, 2007 (EP) ................................. 07017615

(51) Int. Cl.
*H04J 3/06* (2006.01)
(52) U.S. Cl. ..................................................... 370/503
(58) Field of Classification Search .......... 370/503–520
See application file for complete search history.

(56) References Cited

U.S. PATENT DOCUMENTS

| | | | | |
|---|---|---|---|---|
| 5,566,180 | A * | 10/1996 | Eidson et al. | 370/473 |
| 6,278,710 | B1 * | 8/2001 | Eidson | 370/394 |
| 7,379,480 | B2 * | 5/2008 | Balasubramanian et al. | 370/516 |
| 7,602,873 | B2 * | 10/2009 | Eidson | 375/371 |
| 7,689,854 | B2 * | 3/2010 | Ilnicki et al. | 713/400 |
| 2004/0141526 | A1 | 7/2004 | Balasubramanian | |

FOREIGN PATENT DOCUMENTS

EP 1717978 A1 11/2006

(Continued)

OTHER PUBLICATIONS

IEEE 1588, IEEE Standard for a Precision Clock Synchronization Protocol for Networked Measurment and Control System, 154 pages, 2002.*

(Continued)

*Primary Examiner*—Frank Duong

(57) ABSTRACT

There is described a method for transmitting synchronization messages in a communication network, the communication network comprising a plurality of network nodes communicating with one another, each containing an internal clock, which is timed with a node clock frequency assigned to the respective network node. The synchronization messages transmitted in the communication network serve to synchronize the times of the internal clocks of the network nodes and contain the pulse counter status of a synchronization clock operating at a predefined synchronization clock frequency. The pulse counter status is estimated by each network node and updated in the synchronization message. Changes in the synchronization clock frequency are taken into account when estimating the pulse counter status. Precise determination of the pulse counter status is achieved with the aid of an approximation of the change over time in the pulse ratio between synchronization clock frequency and node clock frequency by means of a function, with the result that the pulse ratio on transmission of a new synchronization message can be predicted and a precise current pulse counter status can be determined on the basis of the predicted pulse ratio. The method is particularly suitable for use in a communication network of an industrial automation system, whose components communicate with one another for example according to the Profinet standard.

17 Claims, 1 Drawing Sheet

FOREIGN PATENT DOCUMENTS

| | | |
|---|---|---|
| WO | WO 9806194 A1 | 2/1998 |
| WO | WO 0213431 A2 | 2/2002 |
| WO | WO 03047134 A2 | 6/2003 |

OTHER PUBLICATIONS

IFAC, PROFINET, 14 pages, 2005.*

Na et al, Synchronization Performance of the Precision Time Protocol, IEEE, 8 pages, Oct. 2007.*

Jasperneite, Jürgen; Shebab, Khaled; Weber, Karl: "Enhancements to the Time Synchronization Standard IEEE-1588 for a System of Cascaded Bridges", Factory Communication Systems, 2004. Proceedings. 2004 IEEEInternational Woekshop on Vienna, Austria Sep. 22-24, Piscataway, NJ, USA, pp. 239-244; Others.

James, David V., "Residential Ethernet: Time-of-day timer synchronization" [Online] Jul. 2005, pp. 1-20; URL:http://www.ieee802.org/1/files/public/docs2005/resb-dvj-SyncSlides-051204.pdf> [found on Jan. 30, 2008]; Others.

* cited by examiner ately is referred to in the text of the patent.

METHOD FOR TRANSMITTING SYNCHRONIZATION MESSAGES IN A COMMUNICATION NETWORK

CROSS REFERENCE TO RELATED APPLICATIONS

This application claims priority of European Patent Office application No. 07017615.1 EP filed Sep. 7, 2007, which is incorporated by reference herein in its entirety.

FIELD OF INVENTION

The invention relates to a method for transmitting synchronization messages in a communication network and a corresponding communication network.

BACKGROUND OF INVENTION

Communication networks are used in a very wide range of areas to control work sequences in a decentralized manner. In industrial automation systems in particular it is particularly important for the automatic work processes to be coordinated with one another. This is achieved in that the individual communicating network nodes in the communication network have internal clocks, with synchronization messages being transmitting to synchronize all the internal clocks. The internal clock of a respective network node hereby operates at a corresponding node clock frequency, which may in some instances be different for the individual network nodes. The clocks are synchronized on the basis of a predefined synchronization clock frequency, with the synchronization messages being transmitting as a function of the synchronization frequency. This means that synchronization messages are sent at fixed clock intervals according to the synchronization clock frequency. The individual synchronization messages transmitted in the communication network contain the pulse counter status of the synchronization clock. Each network node updates this pulse counter status by estimating the number of pulses of the synchronization clock between transmission of the synchronization message at the preceding network node and receipt of the synchronization message at the respective network node. This estimate is generally carried out by estimating the pulse ratio (also referred to as the Rate Compensation Factor RCF) between the synchronization clock frequency and the node clock frequency of the respective network node. The estimated pulse ratio can then be used to convert the time interval between receipt of a synchronization message at the preceding network node and receipt of the synchronization message at the respective network node, measured in node clock frequency pulses, to synchronization clock frequency pulses. The resulting number of pulses is then added to the pulses of the received synchronization message and a correspondingly updated synchronization message is sent out again from the corresponding network node. It is problematic here that fluctuations can occur in the synchronization clock frequency, which result in an imprecise estimation of the pulse ratio and therefore incorrect determination of the pulse counter status of the synchronization clock in the individual network nodes.

The Profinet standard is known from the prior art in the field of industrial automation, this being an Ethernet which meets industrial requirements. This standard operates according to the principle set out above, according to which the pulse counter statuses in the synchronization messages are updated in the network nodes. Profinet-based systems generally use the standard IEEE 1588 to synchronize the internal clocks of the network nodes, said standard updating the pulse counter statuses of the synchronization messages according to the principle set out above. According to this standard synchronization messages are transmitted in succession from one network node to the next in a logical sequence or tree structure. The synchronization messages originate from a master element, which is the first element in the sequence or in the tree structure. The synchronization messages originally contain a time stamp of the counter of a synchronization clock in the master element when a synchronization message was transmitted. The network nodes in the sequence or tree structure process and forward this information. A network node here adds all the estimated time delays between transmission of a synchronization message from the preceding network node and its own transmission of the synchronization message as content to the synchronization message.

As set out above it is problematic with the communication networks known from the prior art that when the synchronization clock frequency of the synchronization clock is changed, errors occur in the determination of the pulse counter status in the network nodes, which in turn results in imprecise synchronization of the internal clocks of the network nodes.

SUMMARY OF INVENTION

An object of the invention is therefore to create a method for transmitting synchronization messages in a communication network, which allows precise synchronization of the individual internal clocks of the network nodes.

This object is achieved by the independent claims. Developments of the invention are set out in the dependent claims.

The inventive method is deployed in a communication network, which comprises a plurality of network nodes communicating with one another, each containing an internal clock, which is timed at a node clock frequency assigned to the respective network node, the synchronization messages serving to synchronize the internal clocks of the network nodes.

In the inventive method the synchronization messages are sent in succession from a preceding network node to a subsequent network node as a function of a synchronization clock frequency predefined by a synchronization clock, the synchronization messages containing the pulse counter status of the synchronization clock. A respective network node hereby detects the change over time in pulse ratio between the synchronization clock frequency and its node clock frequency at predefined time intervals based on synchronization messages received in the past. On the basis of this detected change over time in pulse ratio the respective network node approximates the pattern over time of the pulse ratio by means of a function so that there is a mathematical relationship between time and the behavior of the pulse ratio. On the basis of the pattern over time of the pulse ratio approximated using the function the respective network node updates the pulse counter status of a received synchronization message to the pulse counter status on transmission of the synchronization message to the next network node.

The inventive approximation of the behavior over time of the pulse ratio using a function takes into account a change in the pulse ratio due to a change in the synchronization clock frequency and/or the node clock frequency when determining the pulse counter status. In particular the pulse ratio at the time of transmission of the synchronization message to the next network node can be predicted using the function, thereby achieving significantly more precise determination of the current pulse counter status.

In a preferred embodiment of the inventive method the pulse counter status of the synchronization message is updated in such a manner that the number of synchronization pulses is determined between transmission of the synchronization message at the preceding network node and transmission of the synchronization message at the respective network node, with the approximated pattern over time of the pulse ratio in combination with a predefined time delay being used to determine this number of synchronization pulses, with the time delay including the transmission time for a synchronization message from the preceding network node to the respective network node and the processing time for a received synchronization message in the respective network node.

In one embodiment of the inventive method the approximated pattern over time of the pulse ratio is used to determine the pulse ratio at the time of transmission of a synchronization message at the preceding network node, this pulse ratio in combination with the predefined time delay being used to determine the number of synchronization pulses between transmission of the synchronization message at the preceding network node and transmission of the synchronization message at the respective network node. The pulse ratio is therefore assumed to be constant between transmission of the synchronization message at the preceding network node and transmission of the synchronization message at the respective network node. This does not always correspond to actual circumstances but it has proven that the resulting error is very small. One advantage of this variant is the simple calculation of the number of synchronization pulses within the predefined time delay, which can in particular be determined by multiplying the pulse ratio, which is assumed to be constant, by the time delay.

More precise determination of the number of synchronization pulses within the time delay can be achieved in one variant of the invention by integrating the approximated pattern over time of the pulse ratio over the time delay and using this integration to determine the number of synchronization pulses between transmission of the synchronization message at the preceding network node and transmission of the synchronization message at the respective network node. In particular the integration result here represents this number of synchronization pulses within the time delay.

In a further variant of the inventive method the change over time in the pulse ratio in a respective network node is determined based on the mean values of the pulse ratio between past successive synchronization messages.

The function used to approximate the pattern over time of the pulse ratio is preferably a linear function, i.e. the determined change over time in the pulse ratio represents a straight line gradient. In a particularly preferred embodiment, the linear function, referred to as RCF(t), is as follows:

$$RCF(t) = \Delta m \cdot (t + T_{sync}/2) + p2$$

where t is measured from transmission of a synchronization message at a network node preceding the respective network node and where $T_{sync}$ is the time interval between two successive synchronization messages.

$\Delta m$ is also a straight line gradient, corresponding to the change over time in the pulse ratio, which was detected based on synchronization messages received in the past and p2 is the mean pulse ratio between two successive synchronization messages at the time of transmission of the synchronization message at the preceding network node.

As can be seen from the detailed description in the application, it is possible with the above linear function RCF(t) to avoid errors in the determination of the pulse counter status in the event of a linear change in the pulse ratio.

In some instances instead of a linear function a polynomial function can also be used to approximate the pattern over time of the pulse ratio. This can increase the accuracy of the method in the event of non-linear changes in the pulse ratio.

In a further embodiment of the inventive method the synchronization clock frequency is generated in a synchronization element in the communication network, it being possible to see the synchronization element as a further network node, which contains the synchronization clock and sends the synchronization messages as a function of the synchronization clock frequency to at least one of the other network nodes of the communication network.

In a particularly preferred embodiment of the inventive method the network nodes in the communication network communicate with one another according to the Profinet standard. The inventive method is also preferably deployed in a communication network in an industrial automation system, in particular in a production line.

As well as the method described above the invention also relates to a communication network with a plurality of network nodes, which communicate with one another, each containing an internal clock, which is timed at a node clock frequency assigned to the respective network node, wherein:
  in the communication network synchronization messages can be sent successively from a preceding network node to a subsequent network node to synchronize the times of the internal clocks of the network nodes as a function of a synchronization clock frequency predefined by a synchronization clock, the synchronization messages containing the pulse counter status of the synchronization clock;
  a respective network node in the communication network is embodied so that during operation of the communication network
    the respective network node detects the change over time in the pulse ratio between the synchronization clock frequency and the respective node clock frequency at predefined time intervals based on synchronization messages received in the past;
    the respective network node approximates the pattern over time of the pulse ratio by means of a function on the basis of the detected change over time in the pulse ratio;
    on the basis of the approximated pattern over time of the pulse ratio the respective network node updates the pulse counter status of a received synchronization message to the pulse counter status on transmission of the synchronization message to the next network node.

The communication network is hereby preferably embodied so that each variant of the method described above can be implemented in the communication network.

BRIEF DESCRIPTION OF THE DRAWINGS

Exemplary embodiments of the invention are described in detail below with reference to the accompanying figures, in which.

DETAILED DESCRIPTION OF INVENTION

The inventive method is preferably deployed in an industrial automation system, in which distributed components of the system communicate with one another, to control manufacturing sequences, e.g. in automobile production. To this end the individual components communicate with one another wirelessly and/or wired by way of a communication network. The components thus represent network nodes of the communication network.

Figure 1:
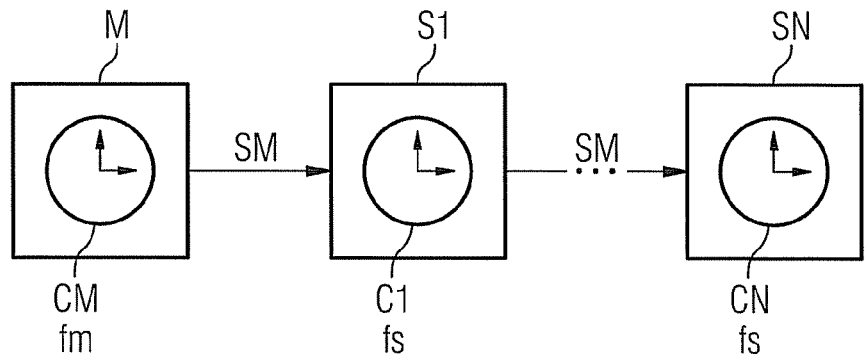
FIG. 1 shows a schematic diagram of a number of network nodes in a communication network, between which synchronization messages are transmitted on the basis of the inventive method.

In the embodiment according to FIG. 1 so-called slaves S1 to SN are shown by way of example as network nodes, each slave having a corresponding internal clock C1, ..., CN. Each of these clocks operates at a predefined slave clock frequency fs, which can in some instances be different for different slaves. A so-called master element M is also provided in the communication network in FIG. 1, having a synchronization clock CM, which predefines a synchronization clock frequency fm, to which all the internal clocks C1, ..., CN of the slaves are to be set. To achieve this, synchronization messages SM are transmitted at constant time intervals, each comprising a predefined number of pulses of the synchronization pulse, by the master element M. Each of these synchronization messages contains the pulse counter status of the clock CM, i.e. the pulses of the synchronization pulse that have already expired during operation of the method. This pulse status is transmitted with each synchronization message SM.

The master element M and the individual network nodes S1 to SN communicate in sequence with one another, with synchronization messages being transmitted from the master element M to the node S1 and from this to the node S2 etc. to the node SN. To achieve precise synchronization in the individual slaves, the pulse counter status in the synchronization messages SM must be updated in the individual slaves. Therefore the time delay, required between transmission of a synchronization message from the preceding slave (or from the master element) and transmission of the synchronization message from the respective slave to the next slave, is known in each slave. This time delay is made up of the time interval LDi and BDi (i=1, ..., N), it being possible for said time interval to be different for each slave. LDi here is the time interval required to transmit the message from the preceding slave Si-1 to the next slave Si (LD=Line Delay). BDi is the processing time required in the slave Si to process a received synchronization message before transmission of the synchronization message to the next slave (BD=Bridge Delay). This delay time is indicated in the respective slave in pulses according to the slave clock frequency.

In order now to update the pulse counter status of a received synchronization message SM, it is necessary to estimate the pulse ratio between the synchronization clock frequency fm and the respective slave clock frequency fs in the respective slave. This pulse ratio is also referred to below as RCF and in the embodiment described here is the quotient of fm and fs. Multiplying the estimated pulse ratio by the time delay gives the number of counter pulses on retransmission of the previously received synchronization message. This number is added to the pulse counter status of the received synchronization message and a synchronization message with this current pulse counter status is transmitted from the respective slave. As described below with reference to FIG. 2, a particularly precise approximation of the pulse ratio RCF can be achieved, so that the error when updating the pulse counter statuses of the synchronization messages is very small, thereby allowing very precise synchronization of the internal clocks of the slaves to be achieved. The synchronization sequence for the internal clocks is sufficiently known to the person skilled in the art and is therefore not described here in detail.

Figure 2:
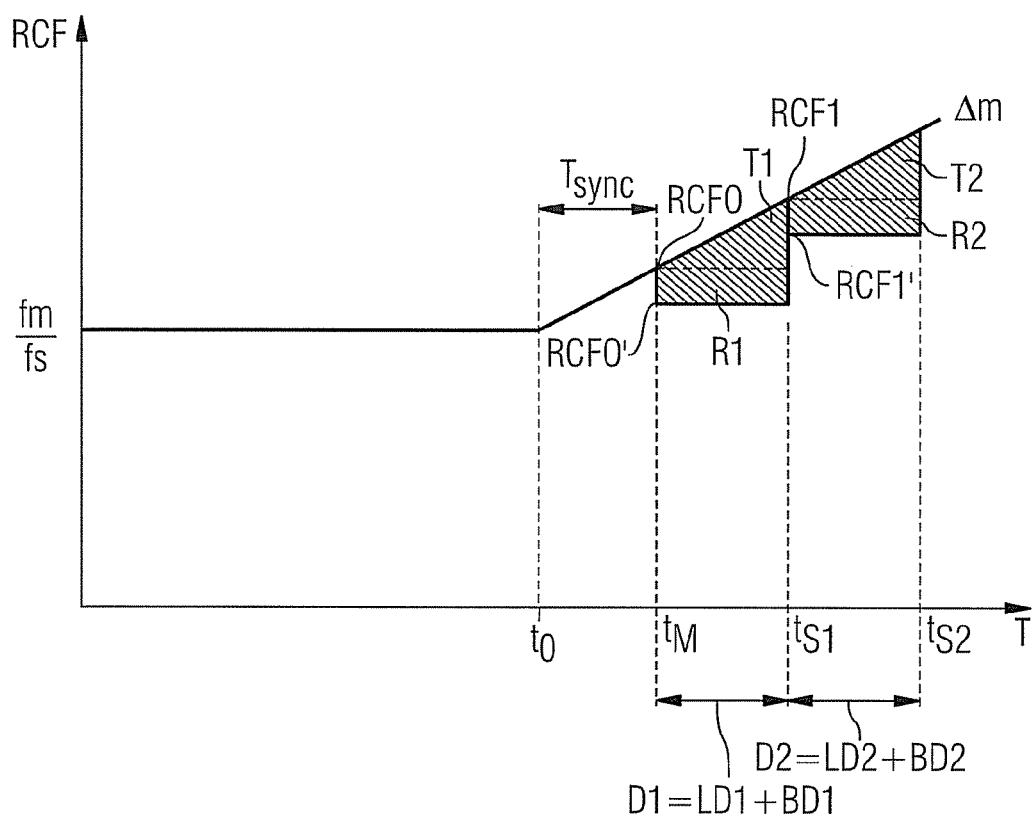
FIG. 2 shows a diagram, illustrating the calculation of the pulse ratio and associated error prevention based on an embodiment of the inventive method.

FIG. 2 shows a diagram, which illustrates a possible change over time in a pulse ratio RCF, an absolute time T being given along the abscissa. The diagram here corresponds to a scenario, in which the pulse ratio RCF is initially at a constant value fm/fs and then increases to a point $t_0$, the increase in the pulse ratio being due to an increase in the frequency fm of the master element M, for example because of temperature fluctuations. The following times are also shown along the abscissa in the diagram in FIG. 2:

$t_M$: time of transmission of a synchronization message at master element M;

$t_{S1}$: time of transmission of a synchronization message from slave S1 to slave S2;

$t_{S2}$: time of transmission of a synchronization message from slave S2 to slave S3.

FIG. 2 also shows the time interval $T_{sync}$, which corresponds to the time interval between two successive synchronization messages. The time period $T_{sync}$ comprises the pulses occurring between two synchronization messages according to the local clock frequency fs of the respective slave, with the clock frequencies of the individual slaves having the same value in the embodiment described here. FIG. 2 also shows the time intervals D1 and D2. D1 here is the time interval between transmission of a synchronization message at the master element M and transmission of the synchronization message at the slave S1 and includes the time delay LD1 produced by transmission of the synchronization message from the master to the slave and the time delay BD1 produced by the processing of the synchronization message in the slave S1. Similarly the time interval D2 relates to the time delay between transmission of a synchronization message from the slave S1 and transmission of a synchronization message at the slave S2, this time period likewise being made up of the time delay LD2 due to transmission of the message from the slave S1 to the slave S2 and the time period BD2 for processing the message at the slave S2.

In the embodiment of the inventive method described here each slave estimates the change over time in the pulse ratio RCF via the change in the pulse counter statuses of a number of received synchronization messages. The slave S1 thus determines the gradient Δm of the straight line resulting from time $t_0$. The slave S1 can also determine the pulse ratio at time $t_M$ by determining the difference between the pulse counter statuses of the synchronization messages transmitted by the master element M at the start and end points of the interval $T_{sync}$. This value is shown as RCF0' in FIG. 1 and does not correspond to the actual value of the pulse ratio at time $t_M$, as the pulse ratio in the embodiment in FIG. 2 increases continuously. The actual value of the pulse ratio at time $t_M$ is shown as RCF0 in FIG. 2.

Like the slave S1 the slave S2 can determine the pulse ratio at time $t_{S1}$. The resulting value RCF1' again does not correspond to the actual value RCF1 of the pulse ratio at time $t_{S1}$. If the number of pulses within the time periods D1 and D2 were to be determined on the basis of values of the pulse ratios RCF0' and RCF1' assumed to be constant, this would produce an error, shown in FIG. 2 as a hatched region. The area of the hatched region here corresponds to the difference between the number of pulses of the master element actually occurring between times $t_M$ and $t_{S2}$ and the number of pulses determined on the basis of the pulse ratios RCF0' and RCF1' assumed to be constant.

The error according to the hatched region is divided here into two triangles T1 and T2 and two rectangles R1 and R2. The error can be calculated mathematically as follows:

$$\text{Error} = \Delta m/2 \cdot ((LD1+BD1)^2 + (LD2+BD2)^2 + (LD1+BD1) \cdot T_{sync} + (LD2+BD2) \cdot T_{sync})) \quad (1)$$

To compensate for this error, the behavior over time of RCF is approximated. To this end the change over time in RCF is determined at regular intervals, by detecting the change over time in RCF0' and using it to calculate $\Delta m$. In the example in FIG. 2 therefore the behavior over time of RCF is approximated using a linear function, so that the change over time is detected as a straight line gradient $\Delta m$. To determine the offset of the straight line in a vertical direction, it is taken into account that at time $t_M$ the actual value RCF0 of the pulse ratio is $\Delta m \cdot T_{sync}/2$ higher than the value of the pulse ratio RCF0' determined in the slave S1. This gives the following straight line function RCF(t):

$$RCF(t) = \Delta m \cdot (t + T_{sync}/2) + p2 \quad (2)$$

Here t is measured from transmission of the synchronization message from the master element M, $\Delta m$ corresponds to the straight line gradient and p2 corresponds to the value of RCF0'.

By determining the above-mentioned straight line function it is now possible to predict the value of the pulse ratio RCF at time $t_{S1}$, and by corresponding integration over the time interval D1 it is possible to determine the precise number of pulses according to the synchronization clock frequency and to update the synchronization message accordingly. In practice the integration is such that the error according to the above equation (1) (without the terms dependent on D2) is added to the value, which results from multiplying the pulse ratio RCF0' originally determined incorrectly by the slave S1 by the time interval D1. The method is implemented in an identical manner for the next slave S2 and further following slaves, so that overall the error according to the hatched region of FIG. 2 no longer occurs.

The representation in FIG. 2 is simply a representation to clarify the method, the change in the pulse ratio shown not corresponding to frequency changes that generally occur. In fact the area of the triangles T1 and T2 is generally much smaller than the area of the rectangles R1 and R2. It is thus also optionally possible in one embodiment of the invention for the value RCF0 at time $t_M$ determined by means of the straight line function to be assumed to be constant over the interval D1. Similarly it is possible to proceed with the interval D2, with the value RCF1 then being assumed to be constant over the interval. The number of pulses is then obtained by multiplying the interval length of D1 and/or D2 by the value RCF0 and/or RCF1.

Also the pattern over time of the pulse ratio does not have to be approximated using a linear function but polynomials can also be used, thereby achieving a more precise estimation of the pattern over time of the pulse ratio.

As can be seen from the above, an appropriate functional approximation of the pattern over time of the pulse ratio allows the pulse ratio at the time of transmission of the synchronization message in the respective slave to be predicted. This allows effective error compensation, said errors being shown as a hatched region in FIG. 2. It is thus possible to determine the pulse counter statuses of the master element with a high level of precision and transmit them with the synchronization messages. This results in precise synchronization of the individual internal clocks of the slaves.

The invention claimed is:

1. A method for transmitting synchronization messages in a communication network, comprising:
    providing a communication network comprising a plurality of network nodes communicating with one another, one of the plurality of network nodes having an internal clock, which is timed at a node clock frequency assigned to the respective network node, the synchronization messages serving to synchronize the times of the internal clocks of the network nodes;
    sending the synchronization messages successively from a preceding network node to a subsequent network node as a function of a synchronization clock frequency predefined by a synchronization clock, the synchronization messages containing a pulse counter status of the synchronization clock; and
    detecting a change over time in the pulse ratio between the synchronization clock frequency and its node clock frequency at predefined time intervals based on the synchronization messages received in the past, wherein the detection is performed by the respective network node, wherein the respective network node approximates a pattern over time of the pulse ratio on the basis of the detected change over time in the pulse ratio by means of a function, and wherein the respective network node updates the pulse counter status of a received synchronization message to the pulse counter status on transmission of the synchronization message to the next network node on the basis of the approximated pattern over time of the pulse ratio.

2. The method as claimed in claim 1, wherein to update the pulse counter status of the synchronization message the number of synchronization pulses between transmission of the synchronization message at the preceding network node and transmission of the synchronization message at the respective network node is determined, with the approximated pattern over time of the pulse ratio in combination with a predefined time delay being used to determine this number of synchronization pulses, the time delay comprising the transmission time for the synchronization message from the preceding network node to the respective network node and the processing time for the received synchronization message in the respective network node.

3. The method as claimed in claim 2, wherein the pulse ratio at the time of transmission of a synchronization message at the preceding network node is determined using the approximated pattern over time of the pulse ratio, this pulse ratio in combination with the predefined time delay being used to determine the number of synchronization pulses between transmission of the synchronization messageat the preceding network node and transmission of the synchronization message at the respective network node.

4. The method as claimed in claim 2, wherein the approximated pattern over time of the pulse ratio is integrated over the predefined time delay and this integration is used to determine the number of synchronization pulses between transmission of the synchronization message at the preceding network node and transmission of the synchronization message at the respective network node.

5. The method as claimed in claim 1, wherein the change over time in the pulse ratio in at least one of purality of network node is detected based on mean values of the pulse ratio between past successive synchronization messages.

6. The method as claimed in claim 2, wherein the change over time in the pulse ratio in at least one purality of network node is detected based on mean values of the pulse ratio between past successive synchronization messages.

7. The method as claimed in claim 3, wherein the change over time in the pulse ratio in at least one the plurlity of network node is detected based on mean values of the pulse ratio between past successive synchronization messages.

8. The method as claimed in claim 4, wherein the change over time in the pulse ratio in at least one the plurality of network node is detected based on mean values of the pulse ratio between past successive synchronization messages.

9. The method as claimed in claim 1, wherein the function used to approximate the pattern over time of the pulse ratio is a linear function.

10. The method as claimed in claim 8, wherein the linear function is as follows:

$$RCF(t)=\Delta m \cdot (t+T_{sync}/2)+p2$$

where t is measured from transmission of a synchronization message at a network node preceding the respective network node, where $T_{sync}$ is the time interval between two successive synchronization messages, where $\Delta m$ is a straight line gradient, which corresponds to the change over time in the pulse ratio detected based on synchronization messages received in the past, where p2 is the mean pulse ratio between two successive synchronization messages at the time of transmission of the synchronization message at the preceding network node.

11. The method as claimed in claim 1, wherein the function used to approximate the pattern over time of the pulse ratio is a polynomial function.

12. The method as claimed in claim 1, wherein the synchronization clock frequency is generated in a synchronization element in the communication network, the synchronization element containing the synchronization clock and transmitting the synchronization messages as a function of the synchronization clock frequency to at least one of the network nodes of the communication network.

13. The method as claimed in claim 2, wherein the synchronization clock frequency is generated in a synchronization element in the communication network, the synchronization element containing the synchronization clock and transmitting the synchronization messages as a function of the synchronization clock frequency to at least one of the network nodes of the communication network.

14. The method as claimed in claim 1, wherein the network nodes in the communication network communicate with one another according to the Profinet standard.

15. The method as claimed in claim 1, wherein the method is deployed in a communication network in an industrial automation system.

16. A production line, comprising:
an automation system, wherein the automation system has a communication network, wherein synchronization messages are transmitted within the communication network, wherein the network has a plurality of network nodes communicating with one another, each one of the plurality of network nodes having an internal clock, which is timed at a node clock frequency assigned to the respective network node, the synchronization messages serving to synchronize the times of the internal clocks of the network nodes, wherein the synchronization messages are send successively from a preceding network node to a subsequent network node as a function of a synchronization clock frequency predefined by a synchronization clock, the synchronization messages containing a pulse counter status of the synchronization clock, wherein a change over time in the pulse ratio between the synchronization clock frequency and its node clock frequency at predefined time intervals is detected based on synchronization messages received in the past, wherein the detection is performed by the respective network node, wherein the respective network node approximates the pattern over time of the pulse ratio on the basis of the detected change over time in the pulse ratio by means of a function, and wherein the respective network node updates the pulse counter status of a received synchronization message to the pulse counter status on transmission of the synchronization message to the next network node on the basis of the approximated pattern over time of the pulse ratio.

17. A communication network with a plurality of network nodes communicating with one another, comprising:
each of the plurality of network nodes including an internal clock, wherein the internal clock is timed at a node clock frequency assigned to the respective network node, wherein in a communication network a plurality of network nodes including an internal clock is sent successively from a preceding network node to a subsequent network node to synchronize the times of the internal clocks of the network nodes as a function of a synchronization clock frequency predefined by a synchronization clock, the synchronization messages containing the pulse counter status of the synchronization clock, wherein a respective network node in the communication network is embodied such that during operation of the communication network the respective network node determines the change over time in a pulse ratio between the synchronization clock frequency and its node clock frequency at predefined time intervals based on the synchronization message received in the past, the respective network node approximates the pattern over time of the pulse ratio by means of a function on the basis of the detected change over time in the pulse ratio and on the basis of the approximated pattern over time of the pulse ratio the respective network node updates the pulse counter status of a received synchronization message to the pulse counter status on transmission of the synchronization message to the next network node.

* * * * *